(12) United States Patent  (10) Patent No.: US 8,531,685 B2
Yoshida  (45) Date of Patent: Sep. 10, 2013

(54) DISPLAY DEVICE, PRINTING APPARATUS, METHOD TO DISPLAY CONTENTS IN STORAGE DEVICES AND A COMPUTER USABLE MEDIUM THEREFOR

(75) Inventor: Shigetaka Yoshida, Aichi (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 820 days.

(21) Appl. No.: 12/241,462

(22) Filed: Sep. 30, 2008

(65) Prior Publication Data

US 2009/0097050 A1  Apr. 16, 2009

(30) Foreign Application Priority Data

Oct. 10, 2007 (JP) ................................. 2007-264452

(51) Int. Cl.
*G06F 3/12* (2006.01)

(52) U.S. Cl.
USPC .......................... 358/1.13; 358/1.15; 358/1.16

(58) Field of Classification Search
USPC ....................................................... 358/1.15
See application file for complete search history.

(56) References Cited

U.S. PATENT DOCUMENTS

| | | | |
|---|---|---|---|
| 7,769,794 B2 * | 8/2010 | Moore et al. ................... | 707/831 |
| 2006/0001908 A1 * | 1/2006 | Ohta ............................ | 358/1.15 |
| 2006/0077424 A1 * | 4/2006 | Maruta et al. ................ | 358/1.15 |
| 2007/0294616 A1 * | 12/2007 | Kizaki .......................... | 715/526 |
| 2008/0297845 A1 | 12/2008 | Sakamoto | |

FOREIGN PATENT DOCUMENTS

| | | |
|---|---|---|
| JP | 07-160842 | 6/1995 |
| JP | 07-271637 | 10/1995 |
| JP | 07-283896 | 10/1995 |
| JP | 07-307847 | 11/1995 |
| JP | 2001-051878 | 2/2001 |
| JP | 2002-059619 A | 2/2002 |
| JP | 2002-067403 A | 3/2002 |
| JP | 2003-085528 | 3/2003 |
| JP | 2005-223862 | 8/2005 |
| JP | 2005-327070 | 11/2005 |
| JP | 2005-348125 A | 12/2005 |
| JP | 2006-004137 A | 1/2006 |

(Continued)

OTHER PUBLICATIONS

JP Office Action dtd Aug. 25, 2009, JP Appln. 2007-264452, English Translation.

(Continued)

*Primary Examiner* — Marivelisse Santiago Cordero
*Assistant Examiner* — Aaron R Gerger
(74) *Attorney, Agent, or Firm* — Banner & Witcoff, LTD.

(57) ABSTRACT

A display device to display contents representing data files stored in at least one external memory device attached to the display device is provided. The display device includes at least one connection interface through which an external memory device is attached to the display device, a judging unit to judge as to whether an external memory device is attached to one of the at least one connection interface, a list creation unit to create a list of data files which are stored in the external memory device according to the judgment made by the judging unit, a timer to measure a predetermined period, and a display control unit to display the list created by the list creation unit based on the data files stored in the external memory device which is attached to the display device before the predetermined period elapses.

20 Claims, 10 Drawing Sheets

(56) References Cited

FOREIGN PATENT DOCUMENTS

| JP | 2006-107376 A | | 4/2006 |
|---|---|---|---|
| JP | 2006-107377 A | | 4/2006 |
| JP | 2007-004568 A | | 1/2007 |
| JP | 2007-072770 A | | 3/2007 |
| JP | 2007072770 | * | 3/2007 |
| JP | 2008-296546 A | | 12/2008 |

OTHER PUBLICATIONS

JP Notification of Reasons for Rejection dated Sep. 13, 2011, corresponding Application No. 2009-242189; English Translation.

* cited by examiner

<EXAMPLE OF FILE LISTS>

| EXTERNAL MEMORY DEVICE 1 | EXTERNAL MEMORY DEVICE 2 | ...... | EXTERNAL MEMORY DEVICE N |
|---|---|---|---|
| LIST 1 | LIST 2 | ...... | LIST N |
| aaa.xx | ccc.xx | ...... | yyy.xx |
| bbb.xx | ddd.xx | ...... | zzz.xx |

FIG. 4

<EXAMPLE OF WINDOW DISPLAY IN LCD>

```
1   aaa.xx
2   bbb.xx
3   ccc.xx
4   ddd.xx
    ⋮
25  yyy.xx
26  zzz.xx
```

FIG. 5

<WITH EXTERNAL MEMORY DEVICE 31 ATTACHED>

<WITH EXTERNAL MEMORY DEVICES 31, 32 ATTACHED>

■ EXAMPLE OF A DISPLAY SETTING WINDOW

SELECT A DISPLAY OPTION WHEN MORE THAN ONE
EXTERNAL MEMORY DEVICE IS ATTACHED:

⦿ DISPLAY DATA FILES IN THE ENTIRE EXTERNAL MEMORY
DEVICES BEING ATTACHED

◯ DISPLAY DATA FILES IN ONE EXTERNAL MEMORY DEVICE
BEING ATTACHED

FIG.11

DISPLAY DEVICE, PRINTING APPARATUS, METHOD TO DISPLAY CONTENTS IN STORAGE DEVICES AND A COMPUTER USABLE MEDIUM THEREFOR

CROSS REFERENCE TO RELATED APPLICATION

This application claims priority from Japanese Patent Application No. 2007-264452, filed on Oct. 10, 2007, the entire subject matter of which is incorporated herein by reference.

BACKGROUND

1. Technical Field

An aspect of the present invention relates to a display device, a printing apparatus, a method to display contents stored in storage devices, and a computer usable medium therefor.

2. Related Art

Conventionally, a display device to display names of files which are stored in each external memory device connected to the display device has been known. In the display device, however, contents of the files stored in the external memory device can be exposed to the other users, and confidentiality of the contents of the files may be risked.

In consideration of the above, in Japanese Patent Provisional Publication No. 2005-327070, for example, a display device which can prevent the files in the external memory devices from being exposed is disclosed. More specifically, when a user attempts to attach an external memory device to the display device which is already connected with a previous user's external memory device, the current user is prompted to remove the previous user's memory device so that the contents of the files stored in the previous user's memory device can be prevented from being exposed. Thus, when the previous user's memory device is removed, the current user is allowed to attach the new external memory device.

SUMMARY

However, the above-referenced display device is assumed to be utilized by a plurality of users, each of which uses one external memory device at a time. Therefore, even when the current user attempts to attach a new external memory device in addition to the currently attached external device, the display device assumes the user has been replaced and prompts the user to remove the currently attached external device in order to attach the new memory device. Thus, it can be inconvenient that the user cannot use a plurality of external memory devices at a time with the display device to view the files stored separately in the respective memory devices.

In view of the above drawback, the present invention is advantageous in that a display device, a printing apparatus, a method to display data contents stored in a plurality of external storage devices being used by one user, and a computer usable medium therefor are provided.

According to an aspect of the invention, a display device to display contents representing data files stored in at least one external memory device attached to the display device is provided. The display device includes at least one connection interface through which an external memory device is attached to the display device, a judging unit to judge as to whether an external memory device is attached to one of the at least one connection interface, a list creation unit to create a list of data files which are stored in the external memory device according to the judgment made by the judging unit, a timer, which is activated after attachment of the external memory device to the display device, to measure a predetermined period, and a display control unit to display the list created by the list creation unit based on the data files stored in the external memory device which is attached to the display device before the predetermined period elapses.

According to the above configuration, the contents of the data files stored in external memory devices which are attached to the display device before the predetermined period elapses are considered to be attached by a single user so that usability of a plurality of external memory devices can be improved when the external memory devices are used by a single user.

According to another aspect of the invention, a display device to display contents representing data files stored in at least one external memory device attached to the display device is provided. The display device includes at least one connection interface through which an external memory device is attached to the display device, a judging unit to judge as to whether a first external memory device is attached to one of the at least one connection interface, a list creation unit to create a first list of data files which are stored in the first external memory device according to the judgment made by the judging unit, an indication receiving unit to receive a user's operation which indicates attachment of an external memory device to the display device is completed, and a display control unit to display the first list created by the list creation unit based on the data files stored in the first external memory device which is attached to the display device prior to receipt of the user's operation through the indication receiving unit.

According to the above configuration, the contents of the data files stored in external memory devices which are attached to the display device before the user's operation is received are considered to be attached by a single user so that usability of a plurality of external memory devices can be improved when the external memory devices are used by a single user.

According to another aspect of the invention, a printing apparatus is provided. The printing apparatus include a printing unit to form an image on a recording medium according to a data file stored in an external memory device, at least one connection interface through which the external memory device is attached to the printing apparatus, a display unit to display information concerning the data file stored in the external memory device being attached to the printing apparatus, a display control unit to restrict displaying the information concerning the data file when a printing operation to print the data file is activated.

According to the above configuration, before the printing operation starts, the external memory devices attached to the printing apparatus are considered to be attached by a single user (a first user); therefore, the contents of the data files stored in the external memory devices are displayed. When the printing operation starts, display of the contents of the data files is restricted so that the contents of the data files which belong to the first user can be prevented from being exposed to a second user even if the first user leaves the printing apparatus operating. Thus, usability of the printing apparatus when used by a plurality of users can be improved.

According to another aspect of the invention, a method to display contents representing data files stored in an external memory device in a display device is provided. The method include steps of judging as to whether the external memory device is attached to the display device, creating a list of data files stored in the attached external memory device, activating a timer to measure time after the external memory device is attached to the display device, and controlling displaying the list created in the list creating step based on the data files stored in the external memory device which is attached to the display device before the predetermined period elapses.

According to the above method, the contents of the data files stored in external memory devices which are attached to the display device before the predetermined period elapses are considered to be attached by a single user so that usability of a plurality of external memory devices can be improved when the external memory devices are used by a single user.

According to another aspect of the invention, a computer usable medium comprising computer readable instructions to display contents representing data files stored in an external memory device in a display device is provided. The computer readable instructions includes steps of judging as to whether the external memory device is attached to the display device, creating a list of data files stored in the attached external memory device, activating a timer to measure time after the external memory device is attached to the display device, and controlling displaying the list created in the list creating step based on the data files stored in the external memory device which is attached to the display device before the predetermined period elapses.

According to the above computer usable medium, the contents of the data files stored in external memory devices which are attached to the display device before the predetermined period elapses are considered to be attached by a single user so that usability of a plurality of external memory devices can be improved when the external memory devices are used by a single user.

BRIEF DESCRIPTION OF THE ACCOMPANYING DRAWINGS

FIG. 4 is a list to illustrate files stored in external memory devices 30 being connected with the MFP 10 according to the first embodiment of the present invention.

FIG. 5 illustrates a list to be displayed in a display unit 13 of the MFP 10 according to the first embodiment of the present invention.

FIG. 11 illustrates a window for display setting in the display unit 13 of the MFP 10 according to a fifth embodiment of the present invention.

DETAILED DESCRIPTION

Hereinafter, embodiments according to aspects of the present invention will be described with reference to the accompanying drawings.

Figure 1:
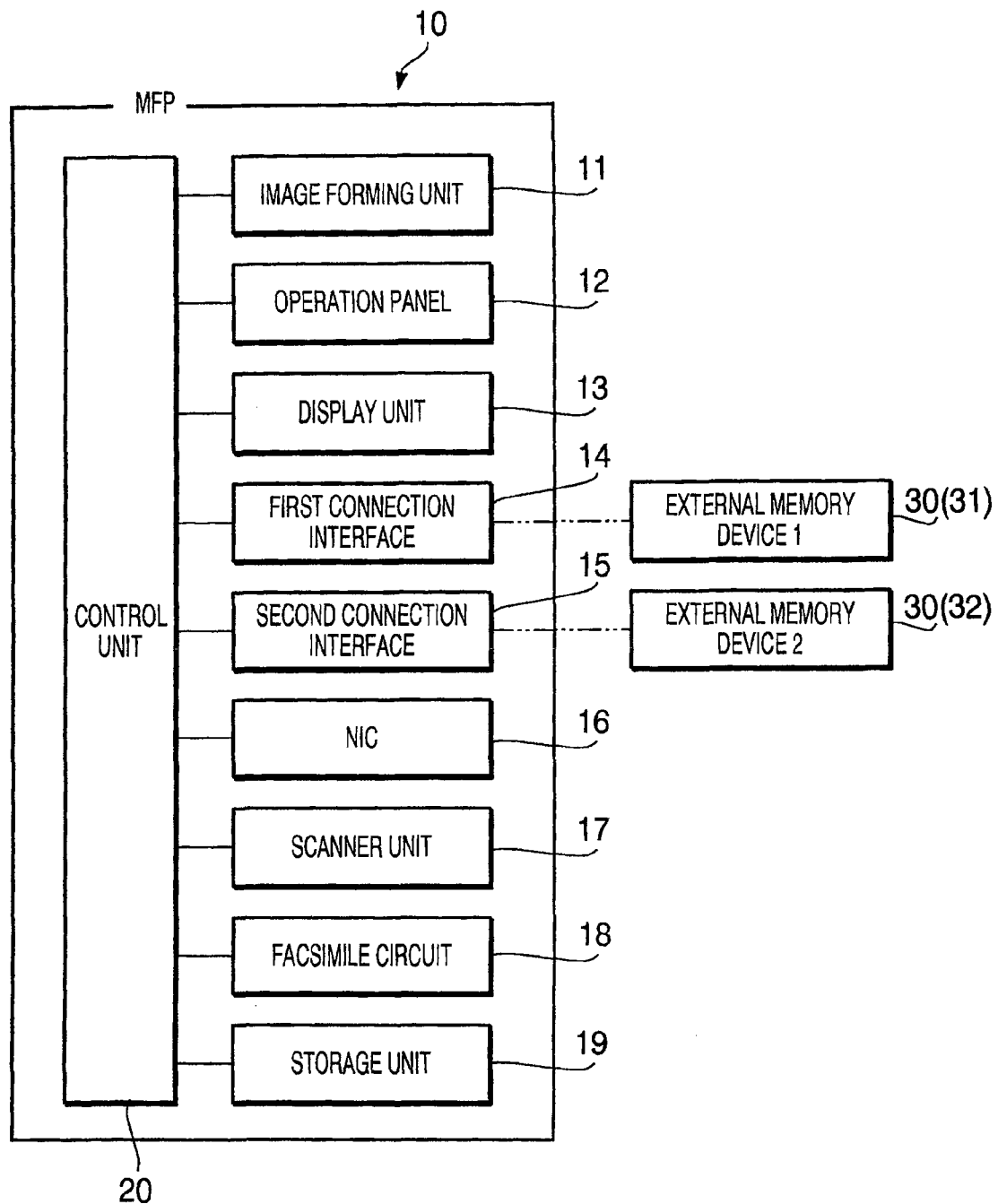
FIG. 1 is a block diagram to illustrate an MFP (multifunction peripheral) 10 according to a first embodiment of the present invention.

A first embodiment according to the present invention will be described. FIG. 1 is a block diagram to illustrate an MFP (multifunction peripheral) 10 having a printing function, a facsimile function, and an image scanning function according to a first embodiment of the present invention.

As shown in FIG. 1, the MFP 10 includes an image forming unit 11 to form an image on a recording medium such as a sheet of paper, an operation panel 12 to be operated by a user to input instructions to the MFP 10, a display unit 13 to present information to the user, a first connection interface 14 and a second connection interface 15, to which external memory devices 30 are respectively detachably attached, an NIC (network interface card) 16 which provides interface with a network, a scanner unit 17, a facsimile circuit 18, and a storage unit 19. The MFP 10 further includes a control unit 20 to control each of the above units.

The control unit 20 is a known microcomputer having a CPU, a ROM, and a RAM (not shown). Various programs to control the MFP 10 are stored in the ROM.

The first connection interface 14 and the second connection interface 15 are, according to the present embodiment, USB interfaces, although configuration of the connection interfaces 14, 15 is not limited to the USB interfaces but may be in different standards.

The external memory devices 30, on the other hand, are configured to have connection terminals which correspond to the connection interfaces 14, 15. Therefore, in the present embodiment, the external memory devices 30 are configured to have USB terminals. The external memory devices 30 may be, for example, a USB memory and an SD memory (registered trademark) which are configured with nonvolatile semiconductor memory device such as a flash memory, a magnetic storage device such as a hard disk drive, and a digital camera which supports PictBridge, a communication standard to connect the external device with the MFP 10.

According to the present embodiment, the MFP 10 is capable of directly printing an image included in a print file stored in the external memory devices 30 which are connected through the first and second connection interfaces 14, 15 without involving an external computer (not shown). The function to directly print such an image stored in the external memory devices 30 is referred to as a direct printing function in the present embodiment.

Additionally, the print file according to the present embodiment refers to a data file in the PDL (page description language) format which can be processed in the MFP 10. According to the present embodiment, the MFP 10 can process image files in the BMP (bitmap) format and the JPEG (joint photographic experts group) for the direct printing. Thus, in the present and the following embodiment, data files which can be processed for the direct printing are referred to as print files.

Figure 2:
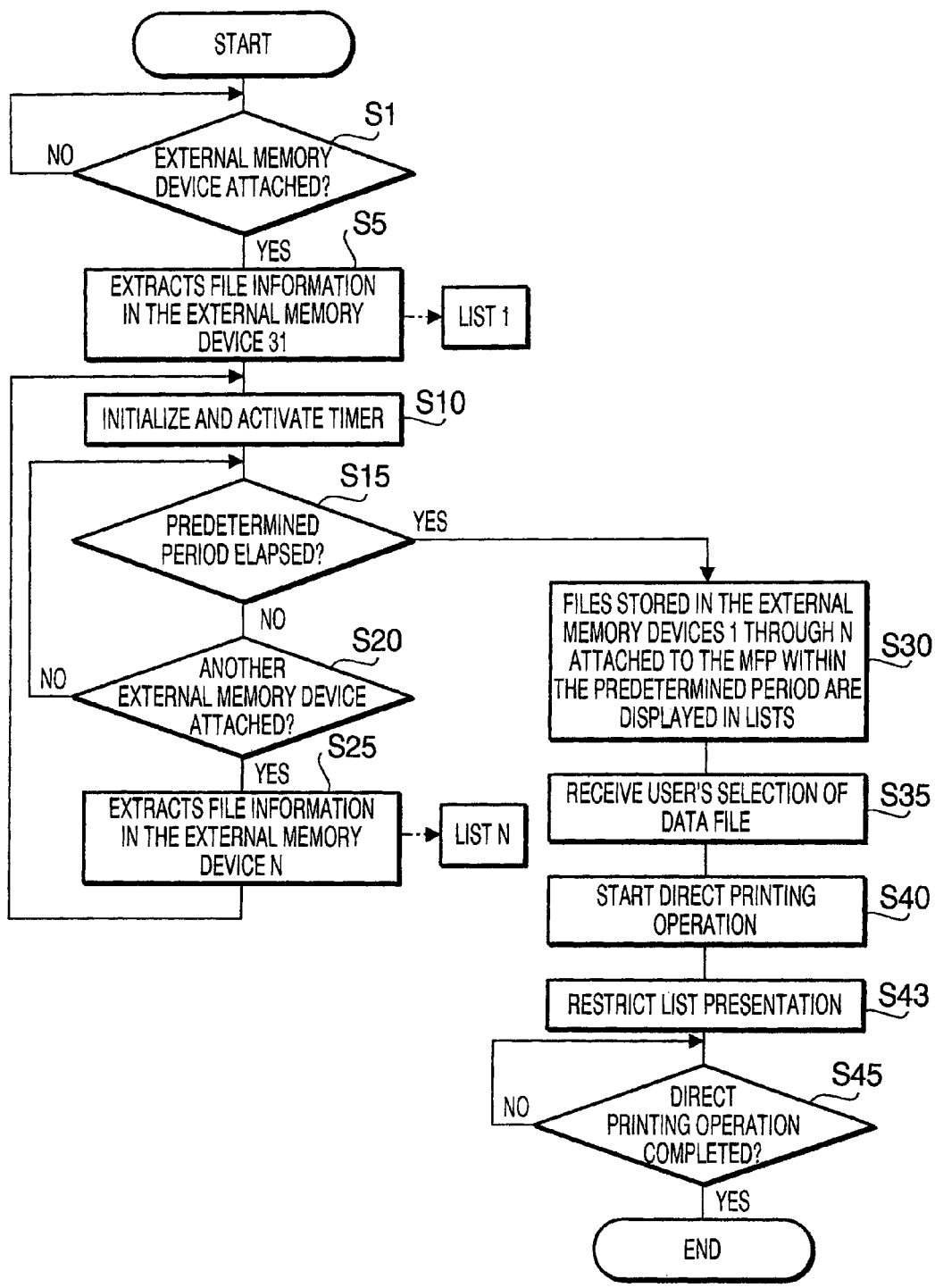
FIG. 2 is a flowchart to illustrate a process to control a file name displaying operation in the MFP 10 according to the first embodiment of the present invention.
Figure 3:
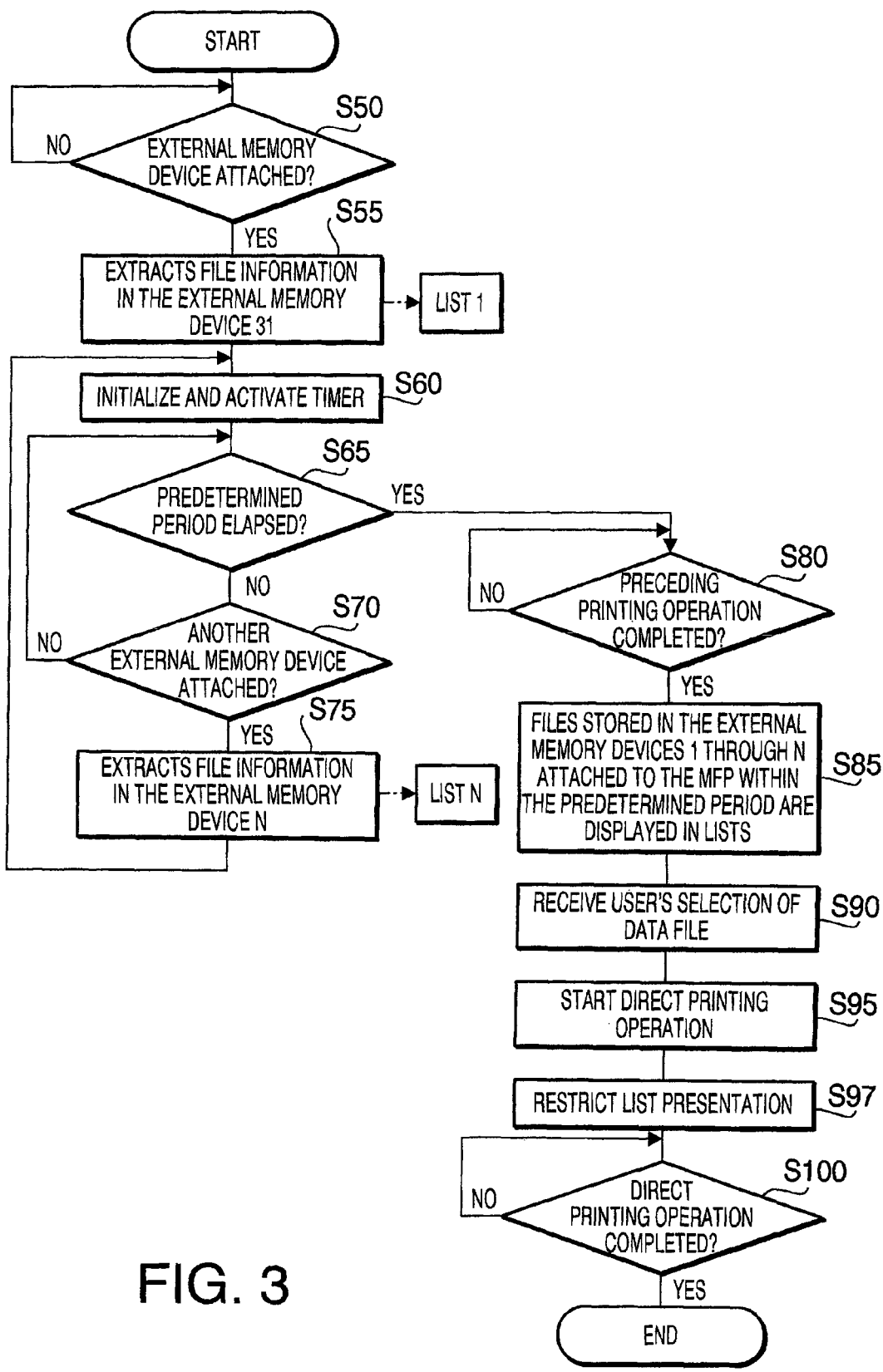
FIG. 3 is a flowchart to illustrate a process to control a file name displaying operation in the MFP 10 according to the first embodiment of the present invention.

Operations in the MFP 10 according to the present embodiment will be described with reference to FIGS. 2-5. FIG. 2 is a flowchart to illustrate a process to control the direct printing operation in the MFP 10 according to the present embodiment of the invention. FIG. 3 is a flowchart to illustrate a process to control an additional direct printing operation in the MFP 10 according to the first embodiment of the present invention. FIG. 4 is a list to illustrate files stored in external memory devices 30 being connected with the MFP 10 according to the first embodiment of the present invention. FIG. 5 illustrates a list to be displayed in a display unit 13 of the MFP 10 according to the first embodiment of the present invention.

The direct printing operations as shown in FIGS. 2 and 3 are activated when the user operates a function key (not shown) provided in the operation panel 12 or displayed in the display unit 13.

The additional direct printing operation, of which flow is shown in FIG. 3, refers to a direct printing operation instructed by the user when a preceding direct printing operation is incomplete in the MFP 10. If a direct printing operation is given to the MFP 10 when the image forming unit 11 is activated, and when the image forming unit 11 is not actually driven but after an instruction to activate the image forming unit 11 for the direct printing is provided by the user, the instruction is referred to as an instruction for an additional direct printing operation.

An operation of the MFP 10 when the direct printing operation is not activated will be described (see FIG. 2). When the MFP 10 is not occupied by a preceding direct printing operation, and when the user provides an instruction to start the direct printing operation through the operation panel 12 or the display unit 13, the operation shown in FIG. 2 is activated, and the process is initiated by the CPU of the control unit 20.

In S1, it is examined as to whether an external memory device 30 is attached to one of the first connection interface 14 and the second connection interface 15. If it is determined that the external memory device 30 is attached to one of the first connection interface 14 and the second connection interface 15 (e.g., the first connection interface 14 in the present embodiment) (S1: YES), in S5, information concerning files stored in the external memory device 30 attached to the first connection interface 14 is extracted, and a list to represent contents of the information is created. Hereinafter, the external memory device attached to the first connection interface is referred to as an external memory device 31.

The information concerning files refers to information appended to the files and includes at least names of the files. Further, for example, owners of the files, created dates of the files, and modified dates of the files may be included.

Thereafter, in S10, a timer (not shown) is initialized and activated to measure time. In S15, it is examined as to whether a predetermined period (e.g., 10 seconds) has elapsed. If the predetermined period has not elapsed (S15: NO), in S20, it is examined as to whether another external memory device 30 is attached to the other connection interface (i.e., the second connection interface 15).

If another external memory device 30 is not attached to the second connection interface 15 (S20: NO), the process repeats S15. If another external memory device 30 is attached to the second connection interface 15 (S20: YES), in S25, information concerning files stored in the external memory device 30 attached to the second connection interface 15 is extracted, and a list to represent contents of the information is created. Hereinafter, the external memory device attached to the second connection interface is referred to as an external memory device 32.

Thereafter, in S10, the timer is again initialized and activated, and in S15, it is examined as to whether the predetermined period has elapsed. In S20, if the second connection interface 15 is maintained unattached (S20: NO), and the predetermined period has elapsed (S15: YES), in S30, the lists concerning the files stored in both of the external memory devices 31, 32 are displayed in the display unit 13 (see FIG. 5).

Thereafter, in S35, the user's operation to select one of the data files in the lists presented in the display unit 13 is received in the MFP 10. In this step, the user is prompted to select one of the files which is to be printed in the direct printing operation. In S40, the direct printing operation for the selected data file is activated.

When the direct printing proceeds, in S43, presentation of the list with the files is restricted, i.e., the lists presented in the display unit 13 are deleted. In S45, it is examined as to whether the direct printing operation is completed. When the direct printing operation is completed (S45: YES), the operation to control the MFP 10 is terminated.

In S45, when the direct printing operation is incomplete (S45: NO), S45 is repeated until the direct printing operation is completed.

Next, an operation of the MFP 10 when the direct printing operation is activated will be described (see FIG. 3). The operation shown in FIG. 3 is initiated when a direct printing operation is in progress, and when the user provides an instruction to start the direct printing operation through the operation panel 12 or the display unit 13.

Steps S50-S75 in the operation are executed similarly to S1-S25 respectively in FIG. 2. Therefore, description of those steps are omitted.

In S60, the timer is initialized and activated to measure time, and in S65, it is examined as to whether the predetermined period has elapsed. In S70, if the second connection interface 15 is maintained unattached (S70: NO), and the predetermined period has elapsed (S65: YES), in S80, it is examined as to whether the preceding direct printing operation is completed.

If the preceding direct printing operation is completed (S80: YES), in S85, the lists created in S55 and S75, concerning the files stored in both of the external memory devices 31, 32, are permitted to be displayed in the display unit 13 (see FIG. 5).

In S80, if the preceding direct printing operation is incomplete (S80: NO), S80 is repeated. Meanwhile, the lists created in S55 and S75 are restricted from being displayed. The restriction is maintained until the direct printing operation is completed.

When the direct printing operation is completed (S80: YES), in S85, the lists created in S55 and S75 are displayed in the display unit 13. Accordingly, in S90, the user's operation to select one of the data files in the lists presented in the display unit 13 is received in the MFP 10. The succeeding steps S95-S100 are executed similarly to steps S35-S45; therefore, description of those steps is omitted.

According to the above embodiment, when a first external memory device 30 is attached to one of the first and second connection interfaces 14, 15, and a second external memory device 30 is attached to the other of the first and second connection interfaces 14, 15 within the predetermined period, it is considered that the second external memory device 30 is attached to be used by the same user as the user of the first external memory device 30 so that the names of the data files stored in the first and second external memory devices 30 are presented in the lists. Thus, usability of the data files stored in the plurality of external memory devices 30 can be improved.

According to the above embodiment, the judgment to determine as to whether the data files in the external memory devices 30 should be exposed is made based on the predetermined period which starts from a point when the last one of the external memory devices 30 is attached, rather than a point when the first one of the external memory devices 30 is attached. Thus, usability of the data files stored in the plurality of external memory devices 30 can be improved, specifically when more than two external memory devices 30 are used by one user.

According to the above embodiment, for example, when solely one external memory device 30 is attached to the MFP 10, a first period, which is from a point of attachment of the external memory device 30 to a point of elapse of the predetermined period, is equivalent to a second period, which is a combination of a period A and the predetermined period. The period A refers to a length of time starting from a point of attachment of the first external memory device 31 and ending at a point of attachment of the last external memory device (i.e., the second external memory device 32). However, it is to be noted that when solely one external memory device is attached to the MFP 10, the first external memory device 31 coincides with the last external memory device 32. Therefore, the period A is zero, and the second period is equated with the first period.

Meanwhile, when more than two external memory devices are attached to the MFP 10, as described in the above embodiment, and when the second external memory device 32 (i.e., the last external memory device) is attached to the MFP 10 within the predetermined period, the period A becomes greater than zero; therefore, the second period becomes greater than the first period.

Thus, the period to make judgment that the attached external devices 30 are to be used by the same user can be practically extended. Therefore, usability of the data files stored in the plurality of external memory devices 30 can be improved, specifically when more than two external memory devices 30 are used by one user.

Further, in the above embodiment, as illustrated in S80 in FIG. 3, the user of the external memory device 32 attached to the MFP 10, which is in process of the preceding direct printing operation, is considered to be a different user from the user of the external memory device 31, which contains the data file currently being processed in the direct printing operation. Accordingly, the file names in the lists are restricted from being exposed.

Furthermore, as represented in S43 in FIG. 2 and S97 in FIG. 3, when the direct printing operation starts, presentation of the file names is ceased; therefore, the file names in the lists are prevented from being exposed, and usability of the MFP 10 when used by a plurality of users can be improved.

Still further, as represented in S85 in FIG. 3, when the preceding direct printing operation is completed, the file names of the files stored in the external memory devices 31, 32, which were attached after the preceding direct printing operation started, can be presented to the user of the external memory devices 31, 32.

Next, a second embodiment according to the present invention will be described. In the present and the following embodiments, configurations similar to those described in the first embodiment will be referred to by identical reference numerals, and description of those will be omitted.

It is to be noted, in the first embodiment, specifically in S30 (FIG. 2) and S85 (FIG. 3), the file names of the data files stored in the external memory devices 31, 32 which are attached within the predetermined period are displayed after the predetermined period elapses. In the present embodiment, however, the file names of the data files stored in the external memory device 30 are displayed each time when thee external memory device 30 is attached to the MFP 10.

Operations in the MFP 10 according to the present embodiment will be described with reference to FIGS. 6, 7A, and 7B.

Figure 6:
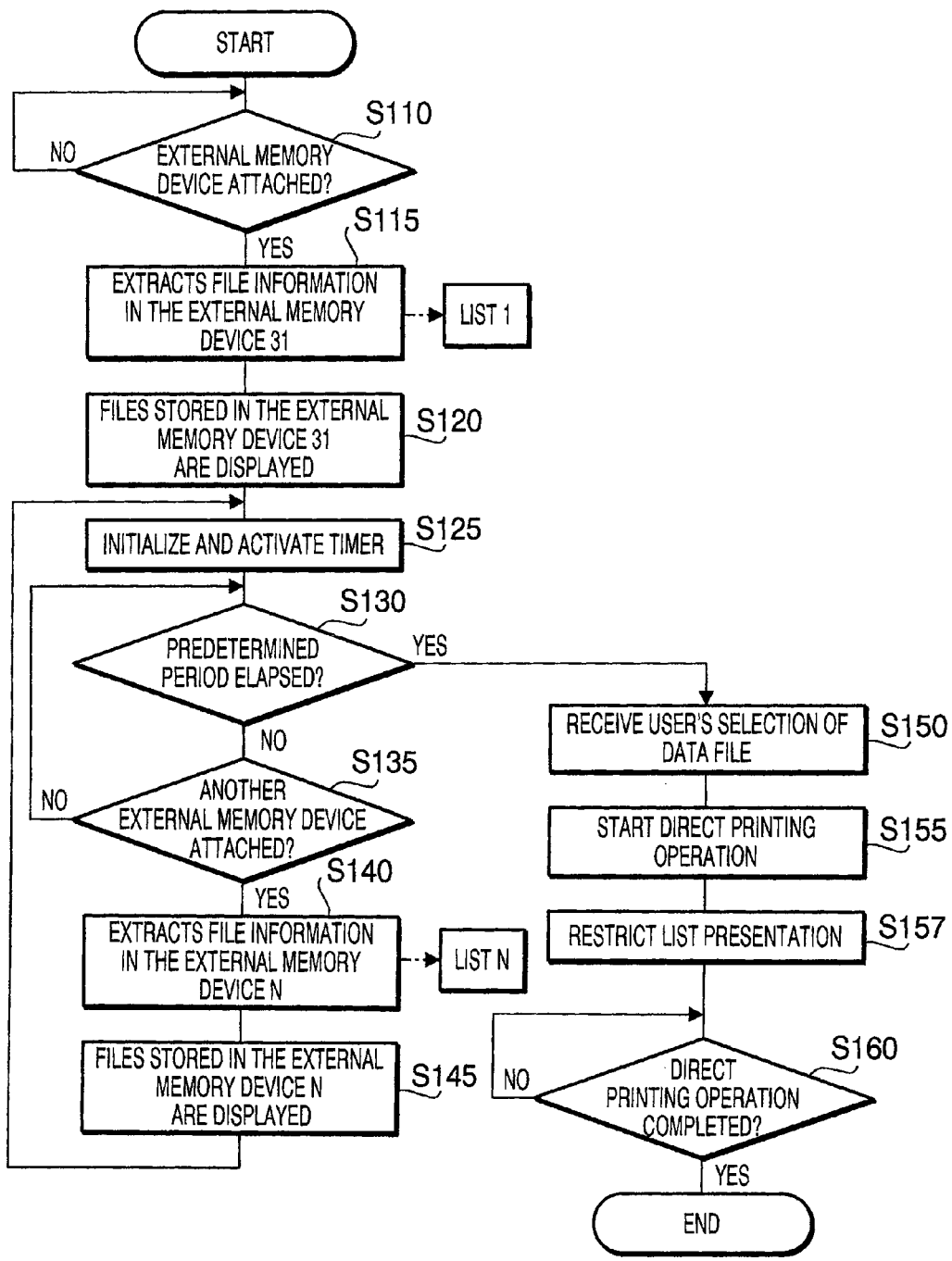
FIG. 6 is a flowchart to illustrate a process to control a file name displaying operation in the MFP 10 according to a second embodiment of the present invention.
Figure 7A:
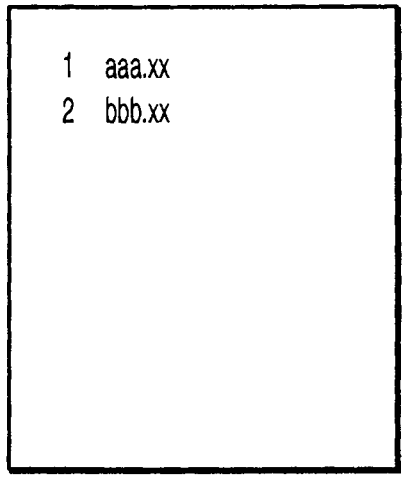
FIGS. 7A and 7B illustrate lists to be displayed in the display unit 13 of the MFP 10 according to the second embodiment of the present invention.
Figure 7B:
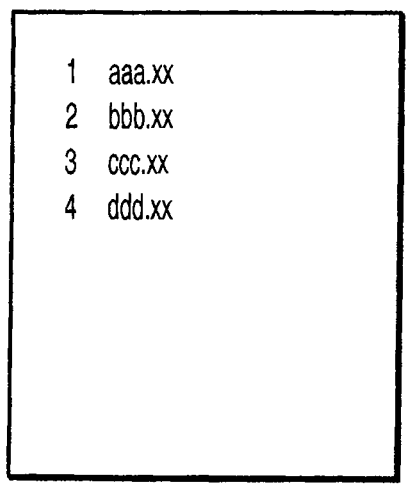

FIG. 6 is a flowchart to illustrate a process to control a file name displaying operation in the MFP 10 according to a second embodiment of the present invention. FIGS. 7A and 7B illustrate lists to be displayed in the display unit 13 of the MFP 10 according to the second embodiment of the present invention.

An operation of the MFP 10 when the direct printing operation is not activated will be described (see FIG. 6). When a direct printing operation is not in progress, and when the user provides an instruction to start the direct printing operation through the operation panel 12 or the display unit 13, the operation shown in FIG. 6 is activated, and the process is initiated by the CPU of the control unit 20.

In S110, it is examined as to whether an external memory device 30 is attached to one of the first connection interface 14 and the second connection interface 15. If it is determined that the external memory device 30 is attached to one of the first connection interface 14 and the second connection interface 15 (e.g., the first connection interface 14 in the present embodiment) (S110: YES), in S115, information concerning files stored in the external memory device 30 attached to the first connection interface 14 is extracted, and a list to represent contents of the information is created. Thereafter, in S120, the list created in S115 (see FIG. 7A) is displayed in the display unit 13.

Steps S125-S140 are executed similarly to steps S10-S25 in FIG. 2; therefore, description of those steps are omitted.

Following S140, in S145, the list created in S140 (see FIG. 7B) is additionally displayed in the display unit 13.

Thereafter, in S125, the timer is again initialized and activated to measure time, and in S130, it is examined as to whether the predetermined period has elapsed. In S135, if the second connection interface 15 is maintained unattached (S135: NO), and the predetermined period has elapsed (S130: YES), the process proceeds to S150. The following steps S150-S160 are executed similarly to steps S35-S45 in FIG. 4.

Next, a third embodiment according to the present invention will be described with reference to FIG. 8. In the above embodiments, the judgment to determine elapse of the predetermined period is made when the second connection interface 15 is maintained unattached for the predetermined period. In the present embodiment, on the other hand, the judgment is made when a total period of time starting from a point of initialization of the timer exceeds the predetermined period.

Figure 8:
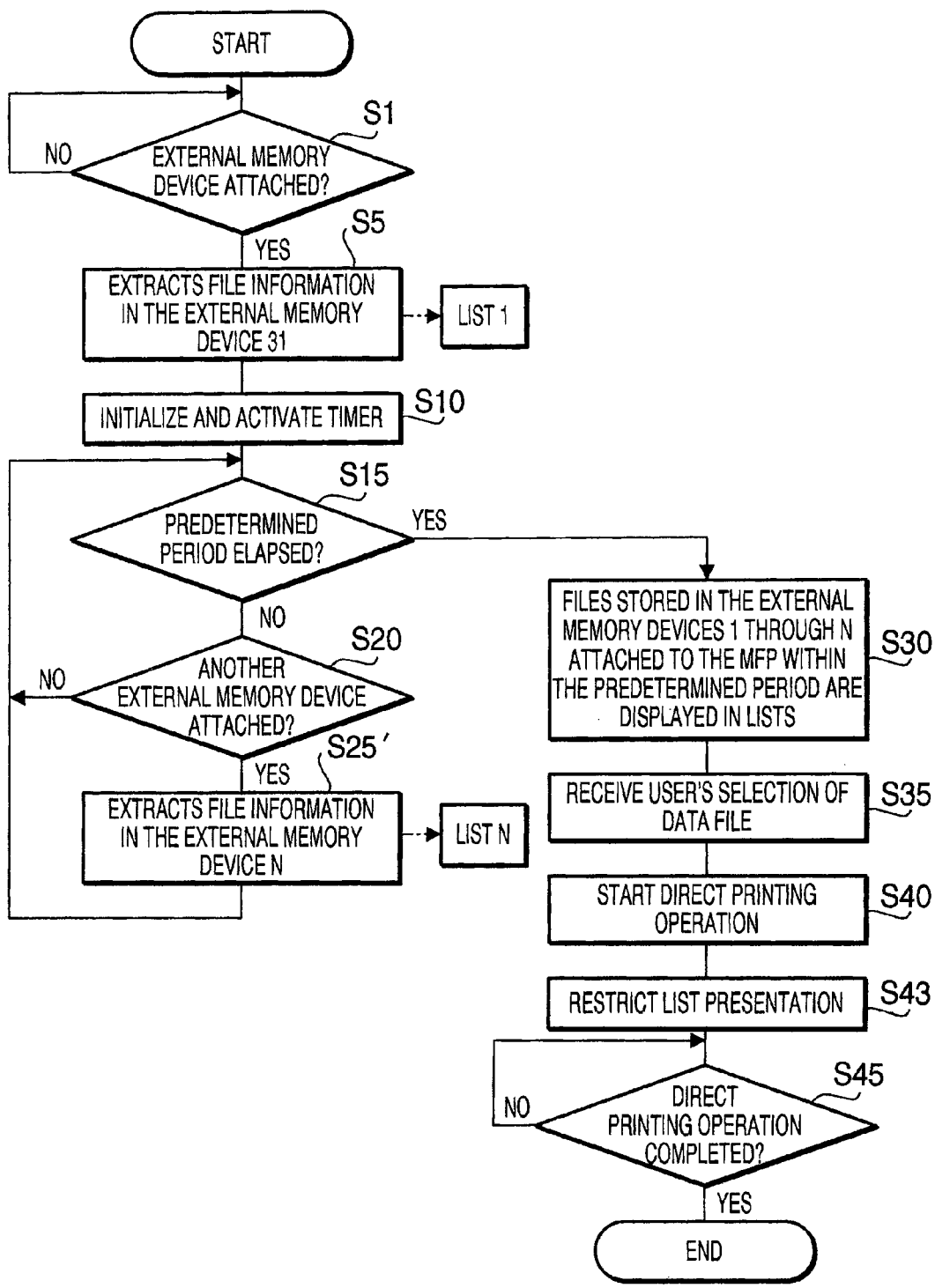
FIG. 8 is a flowchart to illustrate a process to control a file name displaying operation in the MFP 10 according to a third embodiment of the present invention.

FIG. 8 is a flowchart to illustrate a process to control a file name displaying operation in the MFP 10 according to the third embodiment of the present invention. Steps in FIG. 8 are similar to the steps S1-S45 shown in FIG. 2 except the step to follow S25'.

When the timer is initialized and activated in S10, in S20, it is examined as to whether the second external memory device 32 is attached to the second connection interface 15. If the second external memory device 32 is attached to the second connection interface 15 (S20: YES), the process proceeds to S25', and the list to represent the file names of the files stored in the second external memory device 32 is created. Thereafter, the process returns to S15, rather than S10 so that it is examined as to whether the predetermined period has elapsed.

Thus, when the period from S10 to current time exceeds the predetermined period (S15: YES), it is determined that the predetermined period has elapsed, and the lists created in S5 and S25' are displayed in the display unit 13.

It is to be noted that the above modification of the flow can be similarly applied to the flowchart in the second embodiment.

Next, a fourth embodiment according to the present invention will be described with reference to FIGS. 9 and 10. In the above embodiments, judgment of identity of the user using the plurality of external memory devices 30 is based on the time period from a point of attachment of one of the external memory devices 30 to the MFP 10. In the present embodiment, on the other hand, the judgment is made based on an instruction to notify the MFP 10 of completion of attaching the external memory devices 30 entered by the user.

Figure 9:
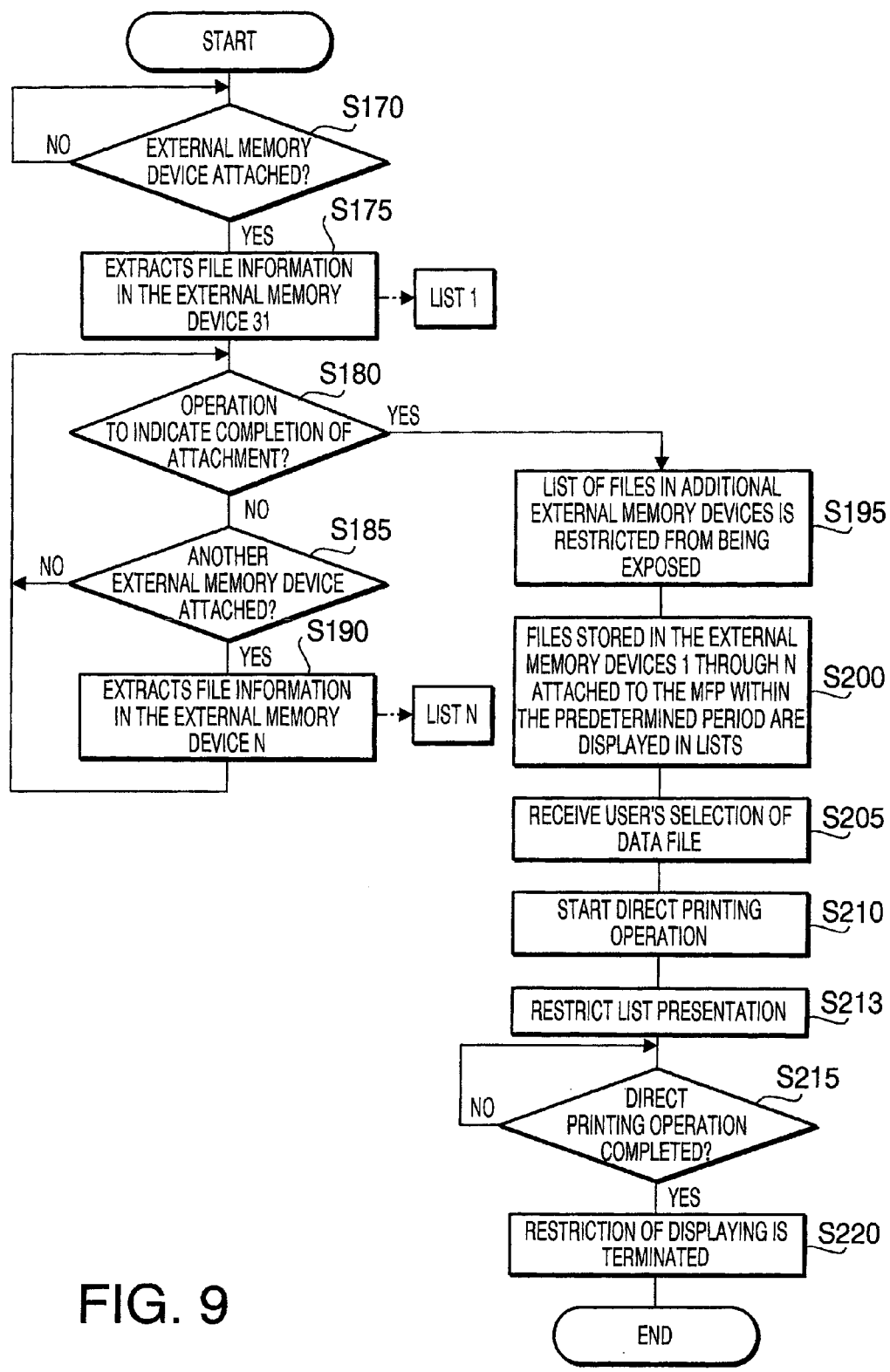
FIG. 9 is a flowchart to illustrate a process to control a file name displaying operation in the MFP 10 according to a fourth embodiment of the present invention.

FIG. 9 is a flowchart to illustrate a process to control a file name displaying operation in the MFP 10 when the MFP 10 is not occupied by a preceding direct printing operation according to the fourth embodiment of the present invention. FIG. 10 is a flowchart to illustrate a process to control a file name displaying operation in the MFP 10 when the MFP 10 is occupied by a preceding direct printing operation according to the fourth embodiment of the present invention.

When the MFP 10 is not occupied by a preceding direct printing operation, and when the user provides an instruction to start the direct printing operation through the operation panel 12 or the display unit 13, the operation shown in FIG. 9 is activated, and the process is initiated by the CPU of the control unit 20. Steps S170-S175 are executed similarly to S1-S5 in FIG. 2; therefore, description of those will be omitted.

In S180, it is examined as to whether the user's operation to a function key (not shown) provided in the operation panel 12 or displayed in the display unit 13 is entered to indicate completion of attaching the desired external memory device 30 to the MFP 10.

If the user's operation is not entered (i.e., it is determined that more external memory device 30 is to be attached) (S180: NO), in S185, it is examined as to whether a second external memory device 32 is attached to the second connection interface 15.

In S185, if the second external memory device 32 is not attached to the second connection interface 15 (S185: NO), the process repeats S180. If the second external memory device 32 is attached (S185: YES), in S190, the file names of the files stored in the second external memory device 32 are extracted, and a list to represent the file names is created.

Thereafter, the process returns to S180, and it is examined as to whether indication of completion of attaching the desired external memory devices 30 is entered (S180: YES), in S195, a list to be possibly created based on contents of additional external memory devices 30 which are attached to the MFP 10 after S190 is restricted from being exposed.

Thereafter, in S200, the lists representing the file names of the data files stored in the external memory devices 31, 32, which are attached prior to the affirmative judgment in S180, are displayed in the display unit 13 (see FIG. 5). Steps S205-S215 are executed similarly to steps S35-S45 in FIG. 2.

In S215, when the direct printing operation is completed (S215: YES), in S220, the restriction set in S195 is terminated. The operation is terminated thereafter.

In S215, when the direct printing operation is incomplete (S215: NO), S215 is repeated until the direct printing operation is completed.

Figure 10:
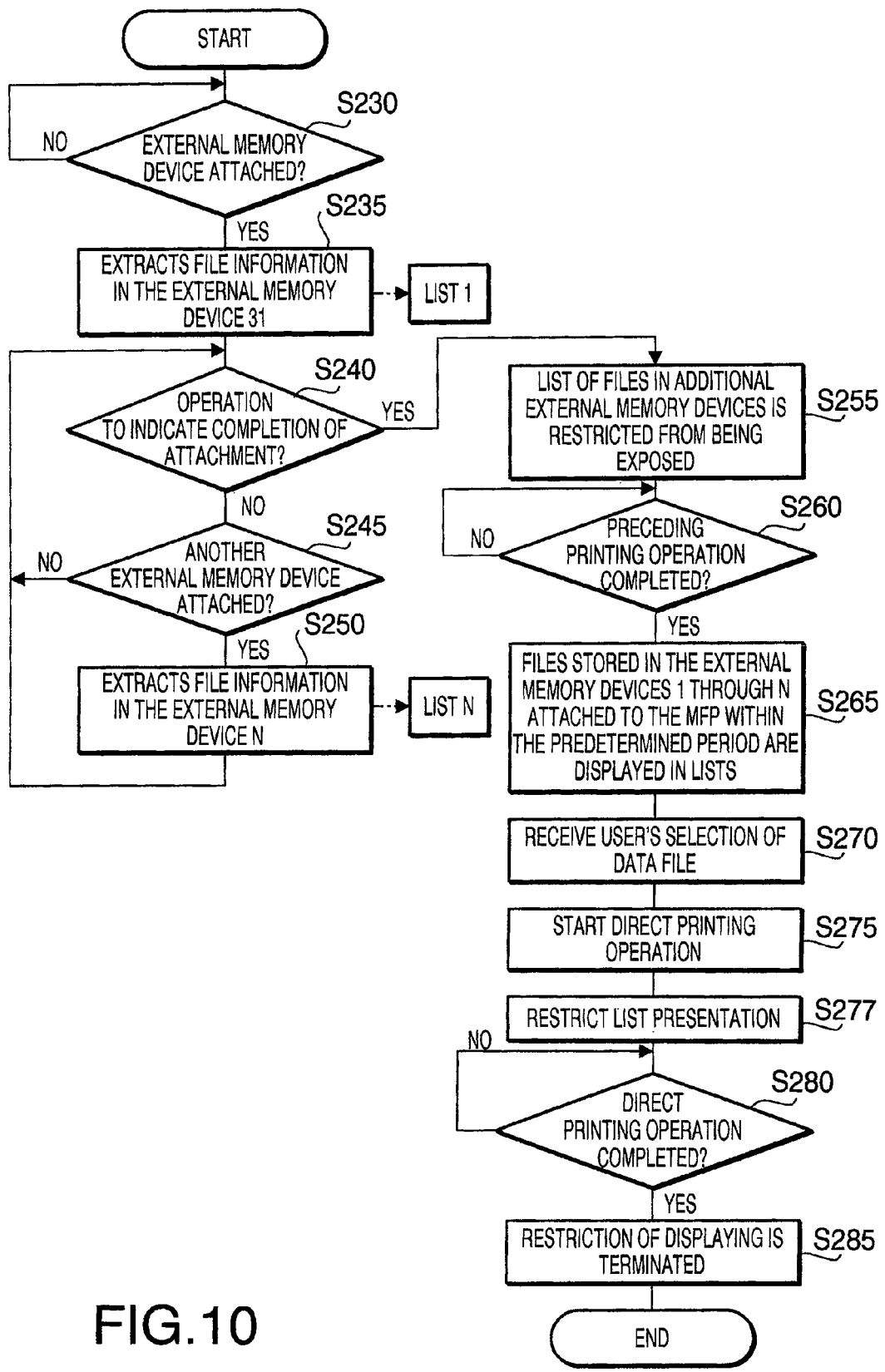
FIG. 10 is a flowchart to illustrate a process to control a file name displaying operation in the MFP 10 according to the fourth embodiment of the present invention.

FIG. 10 is a flowchart to illustrate a process to control a file name displaying operation in the MFP 10 when the MFP 10 is occupied by a preceding direct printing operation according to the fourth embodiment of the present invention.

When the MFP 10 is occupied by a preceding direct printing operation, and when the user provides an instruction to start the direct printing operation through the operation panel 12 or the display unit 13, the operation shown in FIG. 10 is activated, and the process is initiated by the CPU of the control unit 20. Steps S230-S255 are executed similarly to S170-S195 in FIG. 9; therefore, description of those will be omitted.

In S260, it is examined as to whether a preceding direct printing operation is completed. If the preceding direct printing operation is completed (S260: YES), in S265, the lists representing the file names of the data files stored in the external memory devices 31, 32, which are attached prior to the affirmative judgment in S240, are displayed in the display unit 13 (see FIG. 5).

If the preceding direct printing operation is incomplete (S260: NO), S260 is repeated. Meanwhile, the lists created in S235 and S250 are restricted from being displayed. The restriction is maintained until the direct printing operation is completed. Steps S270-S285 are executed similarly to S205-S220 shown in FIG. 9.

According to the above embodiment, when completion of attaching the desired external memory devices 30 is indicated by the user's operation, and judgment to determine the completion is made, the file names of the files stored in the external memory devices 30 which are attached prior to the judgment are allowed to be exposed; therefore, usability of the plurality of external memory devices 30 used by one user can be improved.

In addition, the file names of the files stored in the external memory devices 30 which are attached after the judgment are restricted from being exposed; therefore, usability of the MFP 11 used by a plurality of users can be improved.

Further, the restriction is terminated when the direct printing operation to print the data files stored in the external memory devices 30, which are attached prior to the judgment, is completed. Therefore, the file names of the data files stored in the external memory devices 30 which are attached after the judgment can be presented to the user to view.

A fifth embodiment according to the present invention will be described with reference to FIG. 11. In the above embodiments, all the file names of the data files stored in the plurality of external memory device 30, which are considered to be attached by one user, are displayed. In the present embodiment, on the other hand, an optional configuration to display all the file names stored in the attached external memory devices 30 and an optional configuration to display the file names stored in solely one (e.g., a firstly-attached one) of the attached external memory devices 30 are provided to the user.

FIG. 11 illustrates a window for the display setting in the display unit 13 of the MFP 10 according to a fifth embodiment of the present invention. The user can select one of the options and enter an operation to specify the desired setting by using a function key (not shown) provided in the operation panel 12 or displayed in the display unit 13. When the operation is entered, the file names of the data files stored in the external memory device(s) 30 are displayed in the display unit 13 according to the selected setting.

Although examples of carrying out the invention have been described, those skilled in the art will appreciate that there are numerous variations and permutations of the display device that falls within the spirit and scope of the invention as set forth in the appended claims. It is to be understood that the subject matter defined in the appended claims is not necessarily limited to the specific features or act described above. Rather, the specific features and acts described above are disclosed as example forms of implementing the claims.

For example, application of the method is not limited to the MFP, but the method may be applied to a display device and an image forming apparatus having solely a printing function.

For another example, the method may be applied to an MFP having more than two connection interfaces. Alternatively, the method may be applied to an MFP having solely one connection interface. In this configuration, however, one connection interface is shared by the plurality of external memory devices 30 which are attached to the connection interface in turn.

Further, the predetermined period to wait for an additional external memory device 30 to be attached may not necessarily be fixed, but may be changed according to the user's preferences. Furthermore, presentation of the lists may be restricted from being exposed after the direct printing operation is started and further a predetermined period is elapsed. For another example, presentation of the lists may be restricted from being exposed after initiation of the direct printing operation and when an additional external memory device is newly attached to the MFP.

Further, in the first through third embodiments, the timer is activated after the information concerning the data files are extracted from the attached external memory devices 30; however, the timer may be activated, for example, when the external memory device 30 is attached.

What is claimed is:

1. A display device comprising:
    a connection interface configured to receive an external memory device to be attached to the display device, wherein the external memory device is configured to store data files;
    an additional connection interface configured to receive an additional external memory device to be attached to the display device, the additional external memory device configured to store data files;
    a processor; and
    memory operatively coupled to the processor and storing computer readable instructions that, when executed by the processor, cause the display device to function as:
        a judging unit configured to determine whether an external memory device is attached to the connection interface;
        a list creation unit configured to extract file information stored in the external memory device and generate a list of data files stored in the external memory device in response to the judging unit determining that the external memory device is attached to the connection interface;
        a timer configured to be initialized and begin measuring a predetermined period following the list creation unit generating the list of data files; and
        a display control unit configured to display the list of data files before the predetermined period elapses
    wherein:
        the judging unit is further configured to determine whether an additional external memory device is attached to the additional connection interface before the predetermined period elapses;
        the list creation unit is further configured to extract additional file information stored in the additional external memory device and generate an additional list of data files stored in the additional external memory device in response to the judging unit determining that the additional external memory device is attached to the additional connection interface;
        the timer is further configured to again be initialized and begin measuring the predetermined period following the list creation unit generating the additional list of data files; and
        the display control unit is further configured to display the list of data files stored in the external memory device and the additional list of data files stored in the additional external memory device in response to the external memory device and the additional external memory device being attached to the display device before the predetermined period elapses.

2. The display device according to claim 1, wherein:
    the display control unit is further configured to display the list of data files until the predetermined period elapses; and
    the timer is further configured to be initialized and begin measuring the predetermined period following the display control unit displaying the list of data files.

3. The display device according to claim 2, wherein the display control unit is further configured to display, after the predetermined period elapses, the list of data files stored in the external memory device and the additional list of data files stored in the additional external memory device.

4. The display device according to claim 1, further comprising:
    a plurality of connection interfaces respectively configured to receive a plurality of external memory devices to be attached to the display device, wherein each of the plurality of external memory devices is configured to store data files and file names respectively associated with the data files; and
    memory storing computer readable instructions that, when executed by the processor, cause the display device to function as:
        a specifying unit configured to specify for display, based on a user's operation to a function key provided in the display device, one of a first optional display of the file names of data files stored in each of a plurality of attached external memory devices and a second optional display of the file names of the data files stored in one of the plurality of attached external memory devices.

5. A printing apparatus, comprising:
    a printing unit configured to form an image on a recording medium according to a data file stored in an external memory device;
    a connection interface configured to receive the external memory device to be attached to the printing apparatus, wherein the external memory device is configured to store data files;
    a display unit configured to display information indicative of the data file stored in the external memory device being attached to the printing apparatus;
    a display control unit configured to restrict display of the information indicative of the data file while a direct printing operation to print the data file is in progress and while the external memory device is attached to the printing apparatus;
    an additional connection interface configured to receive an additional external memory device to be attached to the printing apparatus, the additional external memory device configured to store data files;
    a processor; and
    memory operatively coupled to the processor and storing computer readable instructions that, when executed by the processor, cause the printing apparatus to function as:
        a judging unit configured to determine whether the external memory device is attached to the connection interface; and
        a timer configured to begin measuring a predetermined period in response to attachment of the external memory device to the printing apparatus;

wherein the display control unit is further configured to display the list of data files in response to the external memory device being attached to the printing apparatus before the predetermined period elapses, the judging unit is further configured to determine whether an additional external memory device is attached to the additional connection interface before the predetermined period elapses;

the list creation unit is further configured to extract additional file information stored in the additional external memory device and generate an additional list of data files stored in the additional external memory device in response to the judging unit determining that the additional external memory device is attached to the additional connection interface;

the timer is further configured to again begin measuring the predetermined period following attachment of the additional external memory device to the printing apparatus;

the display control unit is further configured to display the list of data files stored in the external memory device and the additional list of data files stored in the additional external memory device in response to the external memory device and the additional external memory device being attached to the display device before the predetermined period elapses.

6. The printing apparatus according to claim 5, wherein:
the list creation unit is further configured to extract file information stored in the external memory device, and
the timer is further configured to be initialized and begin measuring the predetermined period following the list creation unit generating the list of data files.

7. The printing apparatus according to claim 5, wherein:
the display control unit is further configured to display the list of data files until the predetermined period elapses; and
the timer is further configured to be initialized and begin measuring the predetermined period following the display control unit displaying the list of data files.

8. The printing apparatus according to claim 7, wherein the display control unit is further configured to display, after the predetermined period elapses, the list of data files stored in the external memory device and the additional list of data files stored in the additional external memory device.

9. The printing apparatus according to claim 5, wherein the display control unit is further configured to permit display of an additional list of data files stored in the additional external memory device in response to completing the printing operation.

10. The printing apparatus according to claim 5, further comprising:
a plurality of connection interfaces respectively configured to receive a plurality of external memory devices to be attached to the printing apparatus, wherein each of the plurality of external memory devices is configured to store data files and file names respectively associated with the data files; and
memory storing computer readable instructions that, when executed by the processor, cause the printing apparatus to function as:
a specifying unit configured to specify for display, based on a user's operation to a function key provided in the display unit, one of a first optional display of the file names of the data files stored in each of a plurality of attached external memory devices and a second optional display of the file names of the data files stored in one of the attached external memory devices.

11. A method comprising:
first determining whether an external memory device is attached to a display device;
extracting file information stored in the external memory device;
first generating a list of data files stored in the external memory device in response to determining that the external memory device is attached to the display device;
first activating a timer to be initialized and begin measuring a predetermined period following the first generating the list of data files;
first displaying the list of data files before the predetermined period elapses;
second determining whether an additional external memory device is attached to the display device before the predetermined period elapses;
second generating an additional list of data files stored in the additional external memory device in response to determining that the additional external memory device is attached to the display device;
second activating the timer to again be initialized and begin measuring the predetermined period following the second generating the additional list of data files; and
second displaying the list of data files stored in the external memory device and the additional list of data files stored in the additional external memory device in response to the external memory device and the additional external memory device being attached to the display device before the predetermined period elapses.

12. The method according to claim 11, wherein:
the first displaying comprises displaying the list of data files in response to the first generating the list and until the predetermined period elapses; and
the first activating comprises activating the timer to be initialized and begin measuring the predetermined period following the first displaying the list.

13. The method according to claim 12, further comprising third displaying the list of data files stored in the external memory device and the additional list of data files stored in the additional external memory device after the predetermined period elapses.

14. The method according to claim 11, further comprising restricting display of the list in response to executing an operation to utilize one of the data files in the displayed lists.

15. The method according to claim 14, further comprising permitting display of the additional list in response to completing the operation.

16. A non-transitory computer usable medium comprising computer readable instructions comprising steps of:
first determining whether an external memory device is attached to a display device;
extracting file information stored in the external memory device;
first generating a list of data files stored in the external memory device in response to determining that the external memory device is attached to the display device;
first activating a timer to be initialized and begin measuring a predetermined period following the first generating the list of data files;
first displaying the list of data files after beginning measuring the predetermined period and before the predetermined period elapses;
second determining whether an additional external memory device is attached to the display device before the predetermined period elapses;

second generating an additional list of data files stored in the additional external memory device in response to determining that the additional external memory device is attached to the display device;

second activating the timer to again be initialized and begin measuring the predetermined period following the second generating the additional list of data files; and second displaying the list of data files stored in the external memory device and the additional list of data files stored in the additional external memory device in response to the external memory device and the additional external memory device being attached to the display device before the predetermined period elapses.

17. The computer usable medium according to claim 16, wherein:

the first displaying comprises displaying the list of data files in response to the first generating the list and until the predetermined period elapses; and the first activating comprises activating the timer to be initialized and begin measuring the predetermined period following the first displaying the list.

18. The computer usable medium according to claim 17, further comprising third displaying the list of data files stored in the external memory device and the additional list of data files stored in the additional external memory device after the predetermined period elapses.

19. The computer usable medium according to claim 16, further comprising restricting display of the additional list in response to executing an operation to utilize one of the data files in the displayed lists.

20. The computer usable medium according to claim 19, further comprising permitting display of the additional list in response to completing the operation.

* * * * *

UNITED STATES PATENT AND TRADEMARK OFFICE
CERTIFICATE OF CORRECTION

PATENT NO.        : 8,531,685 B2
APPLICATION NO.   : 12/241462
DATED             : September 10, 2013
INVENTOR(S)       : Shigetaka Yoshida It is certified that error appears in the above-identified patent and that said Letters Patent is hereby corrected as shown below:

In the claims

In Column 11, Claim 1, Line 48:
    Please delete "elapses" and replace with -- elapses, --

In Column 11, Claim 1, Line 60:
    Please delete "interface;" and replace with -- interface; and --

In Column 12, Claim 5, Line 64:
    Please delete "interface; and" and replace with -- interface;
    a list creation unit configured to generate a list of data files stored in the external memory device in response to the judging unit determining that the external memory device is attached to the connection interface; and¶ --

In Column 13, Claim 5, Line 9-11:
    Please delete "extract additional file information stored in the additional external memory device and"

In Column 13, Claim 5, Line 13:
    Please delete "iudging" and replace with -- judging --

In Column 13, Claim 5, Line 14-15:
    Please delete "additional"

Signed and Sealed this
Nineteenth Day of July, 2016

Michelle K. Lee
*Director of the United States Patent and Trademark Office*

CERTIFICATE OF CORRECTION (continued)
U.S. Pat. No. 8,531,685 B2

In Column 13, Claim 5, Line 24:

Please delete "display device" and replace with -- printing apparatus --